(12) United States Patent
Paralkar

(10) Patent No.: US 10,808,600 B2
(45) Date of Patent: Oct. 20, 2020

(54) COOLANT CONTROL SYSTEM WITH TEMPERATURE DEPENDENT PARK POSITION AND METHOD OF CONTROLLING A COOLANT CONTROL VALVE

(71) Applicant: Schaeffler Technologies AG & Co. KG, Herzogenaurach (DE)

(72) Inventor: Raghunath Paralkar, Shelby Township, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 102 days.

(21) Appl. No.: 15/657,615

(22) Filed: Jul. 24, 2017

(65) Prior Publication Data

US 2019/0024570 A1 Jan. 24, 2019

(51) Int. Cl.
| F01P 7/16 | (2006.01) |
| H01M 8/04228 | (2016.01) |
| H01M 8/04029 | (2016.01) |
| F16K 11/085 | (2006.01) |
| F01P 7/14 | (2006.01) |

(52) U.S. Cl.
CPC ............ F01P 7/167 (2013.01); F16K 11/085 (2013.01); H01M 8/04029 (2013.01); H01M 8/04228 (2016.02); F01P 2007/146 (2013.01); F01P 2023/08 (2013.01); F01P 2025/30 (2013.01); F01P 2037/00 (2013.01)

(58) Field of Classification Search
CPC .. F01P 2007/146; F01P 7/167; F01P 2025/30; H01M 8/04228
See application file for complete search history.

(56) References Cited

U.S. PATENT DOCUMENTS

| 6,974,251 | B2 | 12/2005 | DeRonne et al. |
| 7,475,594 | B2 | 1/2009 | Schultz |
| 8,706,343 | B2 | 4/2014 | Streib |
| 9,454,153 | B2 | 9/2016 | Sights et al. |
| 2012/0012662 | A1* | 1/2012 | Leen ...................... G05B 15/02 236/51 |
| 2012/0215446 | A1 | 8/2012 | Schunder et al. |
| 2016/0025589 | A1 | 1/2016 | Tseng et al. |
| 2017/0074153 | A1* | 3/2017 | Kaneko ................... F01P 7/165 |
| 2018/0141543 | A1* | 5/2018 | Krosschell ............ B60W 10/06 |
| 2018/0274429 | A1* | 9/2018 | Quix ........................ F01P 11/20 |

* cited by examiner

*Primary Examiner* — Marc E Norman
*Assistant Examiner* — Schyler S Sanks

(57) ABSTRACT

A coolant control system for a vehicle, including: a coolant control valve including a radiator valve; an actuator connected to the coolant control valve; and a control unit. Upon shutdown of the vehicle: the control unit is arranged to generate a control signal based upon a prediction of an ambient temperature and transmit the control signal to the actuator; and the actuator is arranged to receive the control signal and rotate a portion of the radiator valve according to the control signal.

11 Claims, 5 Drawing Sheets

| PREDICTED AMBIENT TEMPERATURE T | COOLANT TEMPERATURE TC | | | |
|---|---|---|---|---|
| | >100°C | >85°C to 100°C | 25°C to 85°C | <25°C |
| ≤5°C | A, C1 | A | A | A |
| >5°C to 25°C | B, C2 | B | A | A |
| >25°C | B | B | B | A |

A=RADIATOR VALVE CLOSED
B=RADIATOR VALVE PARTIALLY OPEN

| PREDICTED AMBIENT TEMPERATURE T | COOLANT TEMPERATURE TC | | | |
|---|---|---|---|---|
| | >100°C | >85°C to 100°C | 25°C to 85°C | <25°C |
| ≤5°C | A, C1 | A | A | A |
| >5°C to 25°C | B, C2 | B | A | A |
| >25°C | B | B | B | A |
| | A=RADIATOR VALVE CLOSED B=RADIATOR VALVE PARTIALLY OPEN | | | |

Fig. 2

| PREDICTED AMBIENT TEMPERATURE T | COOLANT TEMPERATURE TC | | | |
|---|---|---|---|---|
| | >100°C | >85°C to 100°C | 25°C to 85°C | <25°C |
| ≤5°C | A, C, C3 | A, D | A, D | A, D, C5 |
| >5°C to 25°C | B, E, C4 | B, E | A, C | A, D |
| >25°C | B, E, C6 | B, E | B, E | A, C |
| | A=RADIATOR VALVE CLOSED B=RADIATOR VALVE PARTIALLY OPEN C=BYPASS VALVE FULL OPEN D=BYPASS VALVE CLOSED E=BYPASS VALVE PARTIALLY OPEN | | | |

Fig. 4

COOLANT CONTROL SYSTEM WITH TEMPERATURE DEPENDENT PARK POSITION AND METHOD OF CONTROLLING A COOLANT CONTROL VALVE

TECHNICAL FIELD

The present disclosure relates to a coolant control system arranged to position a coolant control valve to a park position dependent upon a prediction of an ambient temperature and a temperature of coolant.

BACKGROUND

FIG. 7 shows prior art coolant control valve 300 in a known park position. Valve 300 includes radiator ball valve 302 and bypass ball valve 304. As is known in the art, upon shut-off an engine associated with valve 300, radiator valve 302 and bypass valve 304 are rotated to the set park positions shown in FIG. 7. The typical park position for valve 302 is at a rotary delivery angle of about 261 degrees. The respective park positions for valves 302 and 304 are fixed for all operating and ambient conditions and all parameters of the engine and coolant control system with which valve 300 is connected. Valves 302 and 304 also are placed in the respective park positions for storage and shipping.

Valve 302 includes ball 306, seal 308, and spring 310. Ball 306 seals against seal 308 to prevent leakage through valve 302 and spring 310 urges seal 308 into contact with ball 306. The cost and weight of valve 302 are reduced by using plastic materials; however, seal 308 can deform if the seal is exposed to excessive temperature and the seal is not properly supported by ball 306. For example, in storage situations and upon engine shut-off, high temperatures can cause seal 308 to become more malleable. The increase in plasticity of seal 308 in conjunction with the force from spring 310 can deform seal 308 where seal 308 is not supported by ball 306. It has been found that the deformation problem worsens with an increase of the diameter of a seal in a coolant control valve. Thus, seal deformation for valve 302 is of greater concern than seal deformation for valve 304. It has been found that the position of ball 306 in the park position of FIG. 7 does not provide adequate support to guard against deformation of seal 308. That is, portion 312 of the seal, not supported by or in contact with ball 306 is too extensive. Seal deformation causes leakage through valve 302 and a loss of thermal efficiency.

SUMMARY

According to aspects illustrated herein, there is provided a coolant control system for a vehicle, including: a coolant control valve including a radiator valve; an actuator; and a control unit. Upon shutdown of the vehicle: the control unit is arranged to generate a control signal based upon a prediction of an ambient temperature and transmit the control signal to the actuator; and the actuator is arranged to receive the control signal and rotate a portion of the radiator valve according to the control signal.

According to aspects illustrated herein, there is provided a method of controlling a coolant control valve for a coolant system for a vehicle, including: operating the vehicle; shutting down the vehicle; creating, with the control unit and based upon a prediction of an ambient temperature, a control signal; transmitting, using the control unit, the control signal; receiving, with an actuator, the control signal; and rotating, with the actuator and according to the control signal, a portion of a radiator valve for the coolant control valve about an axis of rotation for the portion of the radiator valve.

According to aspects illustrated herein, there is provided a method of controlling a coolant control valve for a coolant system for a vehicle, including: operating the vehicle; shutting down the vehicle; receiving, with a control unit, an input including a prediction of an ambient temperature, or receiving using a control unit a temperature input and creating using the control unit a prediction of an ambient temperature; creating, using the control unit and based upon the prediction, a control signal; receiving, with an actuator, the control signal; and rotating, with the actuator and according to the control signal, a portion of a radiator valve for a coolant control valve for the coolant system about an axis of rotation for the radiator valve, and a portion of a bypass valve, for the coolant control valve, about the axis of rotation for the radiator valve.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 2 is an example table depicting instructions for rotating a portion of a radiator valve for a coolant control valve in the coolant control system of FIG. 1;

FIG. 4 is an example table depicting instructions for rotating respective portions of a radiator valve and a bypass valve for a coolant control valve in the coolant control system of FIG. 3;

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
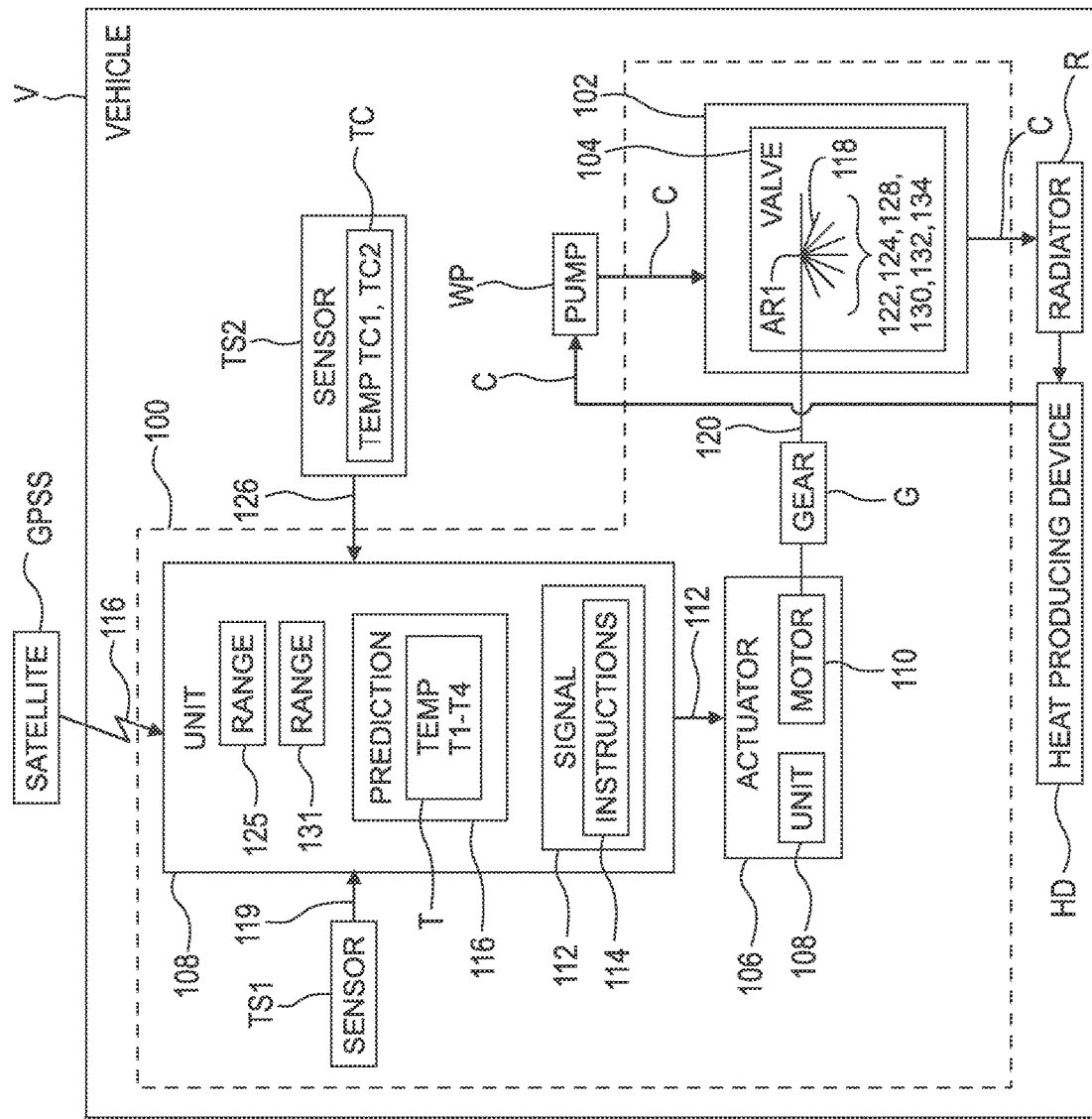
FIG. 1 is block diagram of a coolant control system for a vehicle.

FIG. 1 is block diagram of coolant control system 100 for vehicle V. Vehicle V includes heat-producing device HD. For example, device HD is an internal combustion engine, an electric motor, a fuel cell stack, or a battery. The discussion that follows is directed toward an engine or motor; however, it should be understood that the discussion is applicable to a battery as well. System 100 includes: coolant control valve 102 including radiator valve 104; actuator 106 connected to valve 102; and control unit 108. In an example embodiment, actuator 106 includes electric motor 110. However, it should be understood that actuator 106 is not limited to an electric motor and can use any actuation system known in the art, including, but not limited to, mechanical, electro-mechanical, hydraulic and pneumatic systems. Although system 100 is shown in a vehicle, it should be understood that system 100 can be used in other coolant control systems having the basic components shown in FIG. 1.

In the example of FIG. 1, vehicle V includes water pump WP and radiator R. Upon shutdown of vehicle V, for example of an engine or motor: control unit 108 is arranged to create control signal 112 based upon prediction 116 for ambient temperature T; control unit 108 is arranged to transmit control signal 112 to actuator 106; and actuator 106 is arranged to rotate portion 118 of radiator valve 104 about axis of rotation AR1 for portion 118, to a park position according to control signal 112.

Control unit 108 can be an electrical control unit for vehicle V or can be a dedicated unit on-board actuator 106. For purposes of illustration, both options for unit 108 are shown in FIG. 1; however, it should be understood that only one of the options for unit 108 is needed for system 100 to function. The discussion that follows is directed to unit 108 being a control unit for vehicle V (not on-board actuator 106). In an example embodiment, unit 108 receives temperature input 119 from temperature sensor TS1. Unit 108 then creates prediction 116 based on input 119. In an example embodiment, prediction 116 is wirelessly transmitted to unit 108, for example from global positioning system satellite GPSS.

In an example embodiment: radiator valve 104 is a ball valve and portion 118 is a ball for the ball valve; portion 118 is non-rotatably connected to shaft 120; and actuator 106 is arranged to rotate shaft 120 about axis of rotation AR1 for portion 118 according to control signal 112 to open and close radiator valve 104. In an example embodiment, gears G are located between actuator 106 and shaft 120.

The extent of the rotation of portion 118, and hence the rate of flow of coolant C through coolant control valve 102 is calculated by control unit 108 based on prediction 116 and temperature T. For example: when prediction 116 includes temperature T1, control signal 112 directs actuator 106 to rotate portion 118 to position 122 about axis of rotation AR1; and when prediction 116 includes temperature T2, different from temperature T1, control signal 112 directs actuator 106 to rotate portion 118 to position 122, or position 124 about axis AR. In general, temperatures T[number] are specific examples of temperature T. Position 122 is different from position 124. For example, in position 122, radiator valve 104 is more open than in position 124. For example, as further described below, the choice between positions 122 and 124 is dependent, at least in part, upon the extent of the difference between temperatures T1 and T2.

In an example embodiment, control unit 108 is arranged to receive input 126 from sensor TS2. Input 126 includes temperature TC of coolant C upon shutdown of vehicle V, for example of an engine or motor. In an example embodiment, control signal 112 and the position of portion 118 is calculated by control unit 108 based on prediction 116 and temperature TC. For example, for temperature TC being within range of temperatures 125 at shutdown of vehicle V, for example of an engine or motor, when prediction 116 includes temperature T3, actuator 106 is arranged to rotate portion 118 to position 128 about axis of rotation AR1. For example, for temperature TC within range of temperatures 125 at shutdown of vehicle V, for example of an engine or motor, when prediction 116 includes temperature T4, different from temperature T3, actuator 106 is arranged to rotate portion 118 to position 128 or position 130 about axis AR. Position 130 is different from position 128. For example, as further described below, the choice between positions 128 and 130 is dependent, at least in part, upon the extent of the difference between temperatures T3 and T4.

In an example embodiment, control unit 108 accounts for variations in temperature TC when creating control signal 112. For example, upon shutdown of vehicle V, for example of an engine or motor, and for temperature T in prediction 116 being within range of temperatures 131, for temperature TC1 of coolant C, actuator 106 is arranged to rotate portion 118 to position 132 about axis of rotation AR1; and for temperature TC2 of coolant C, different from temperature TC1, actuator 106 is arranged to rotate portion 118 to position 132 or position 134 about axis of rotation AR1. Position 134 is different from position 132. In general, temperatures TC[number] are specific examples of temperature TC. For example, as further described below, the choice between positions 132 and 134 is dependent, at least in part, upon the extent of the difference between temperatures TC1 and TC2.

FIG. 2 is an example table depicting instructions for rotating portion 118 of radiator valve 104 for coolant control valve 102 in coolant control system 100 of FIG. 1. FIG. 2 is directed temperatures typically associated with an internal combustion engine. However, it should be understood that example tables with temperatures T and TC associated with an electric motor or a battery are possible. In an example embodiment, control unit 108 uses respective ranges of temperatures T and temperatures TC to generate signal 112. In an example embodiment, control unit 108 parses inputs 119 and 126 into respective temperature ranges for T and TC, and control signal 112 is correlated to, or based upon, the respective temperature ranges. In FIG. 2, rows are ranges for temperature T, and columns are ranges for temperature TC. Temperatures T are assigned to one of three ranges: less than or equal to five degrees Celsius; greater than five degrees Celsius and up to and including 25 degrees Celsius; and greater than 25 degrees Celsius. Temperatures TC are assigned to one of four ranges: less than 25 degrees Celsius; from 25 degrees Celsius up to and including 85 degrees Celsius; greater than 85 degrees Celsius to 100 degrees Celsius; and greater than 100 degrees Celsius. Thus, temperatures T1-T4, temperature TC1 and temperature TC2 can be included in respective ranges of temperatures as shown in FIG. 2.

A respective control signal 112 is created by control unit 108 for each cell in FIG. 2. For example, for cell C1, control signal 112 directs actuator 106 to fully close valve 104; and for cell C2, control signal 112 directs actuator 106 to partially open valve 104. Note that the same control signal 112 can be applicable to multiple cells of FIG. 2. It should be understood that the number of ranges and the extent of the ranges for temperatures T and TC can vary from those shown in Table 2.

Figure 3:
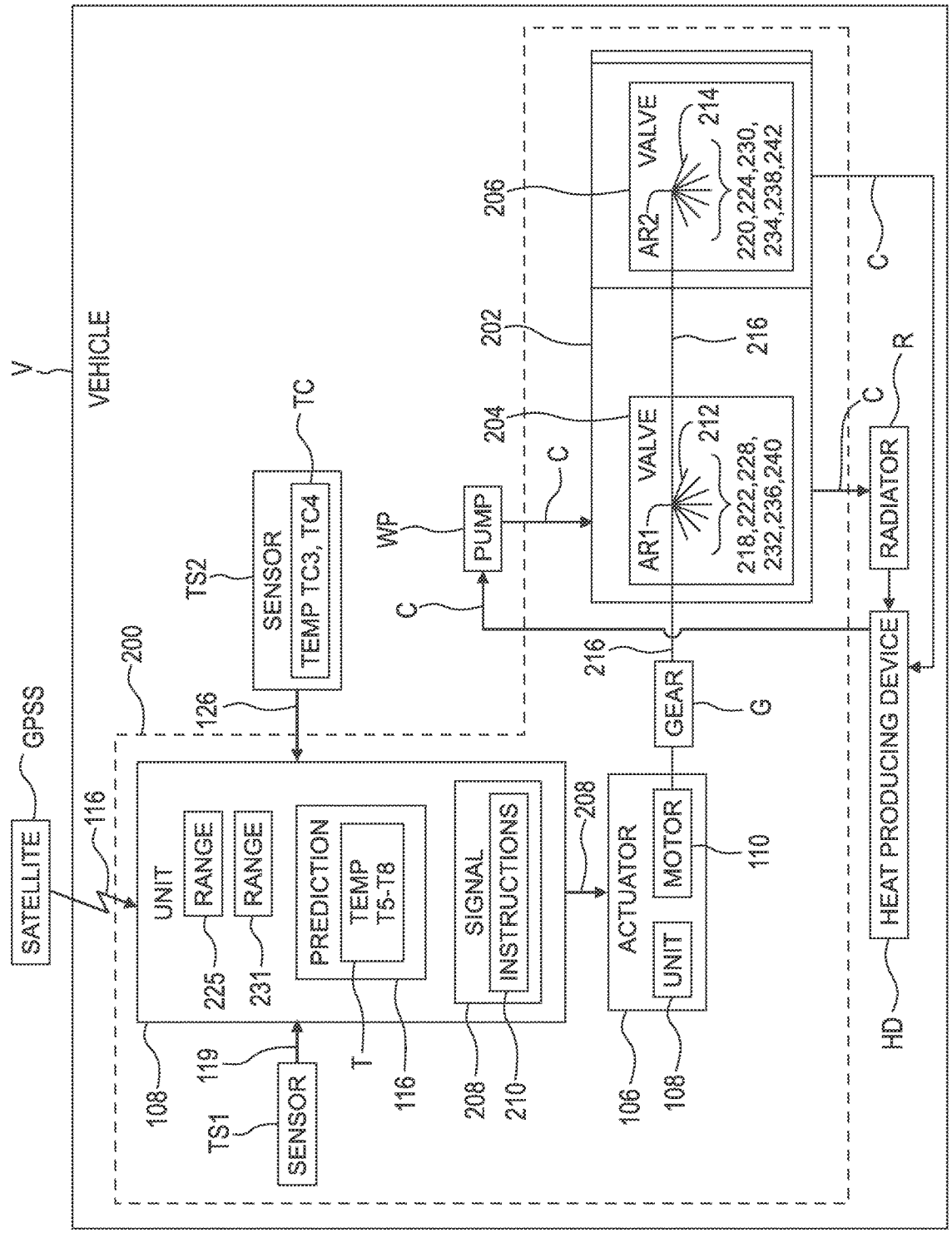
FIG. 3 is block diagram of a coolant control system for a vehicle.

FIG. 3 is block diagram of coolant control system 200 for engine or motor. Coolant control valve 202 includes radiator valve 204 and bypass valve 206. The discussion for FIG. 1 and system 100 is applicable to FIG. 3 and system 200 except as noted. The discussion for FIG. 1 and radiator valve 104 is applicable to FIG. 3 and radiator valve 204 except as noted. Upon shutdown of vehicle V, for example of an engine or motor: control unit 108 is arranged to create control signal 208 based upon prediction 116 for ambient temperature T; control unit 108 is arranged to transmit control signal 208 to actuator 106; actuator 106 is arranged to rotate portion 212 of radiator valve 204 about axis of rotation AR1 for portion 212, to a park position according to control signal 208; and actuator 106 is arranged to rotate portion 214 of bypass valve 206 about axis of rotation AR2 for portion 214, to a park position according to control signal 208. Although system 200 is shown in a vehicle, it should be understood that system 200 can be used in other coolant control systems having the basic components shown in FIG. 3.

In an example embodiment, valves 204 and 206 are ball valves and portions 212 and 214 are respective balls for valves 204 and 206. Shaft 216 is non-rotatably connected to the respective balls and actuator 106 is arranged to rotate shaft 216 and the respective balls about co-linear axis of rotation AR1 and AR2, respectively, for portions 212 and 214 according to signal 208.

Respective control signals 208 and positions for portions 210 and 212 are calculated by control unit 108 based upon prediction 116 and temperature T. For example, when prediction 116 includes temperature T5, control signal 208 directs actuator 106 to rotate portions 212 and 214 to positions 218 and 220, respectively, about axis of rotation AR1/AR2. For example, when prediction 116 includes temperature T6, different from temperature T5, control signal 208 directs actuator 106 to: rotate portion 212 to position 218 or to position 222, different from position 218, about axis AR1/AR2; and rotate portion 214 to position 220 or to position 224, different from position 220, about axis AR1/AR2. For example, as further described below, the choice among positions for portions 212 and 214 is dependent, at least in part, upon the extent of the difference between temperatures T5 and T6.

In an example embodiment, control unit 108 is arranged to receive input 126. The respective positions of portions 212 and 214 are calculated by control unit 108 based on temperature T and temperature TC. For example: for temperature TC at shutdown of vehicle V, for example of an engine or motor, being within range 225, when prediction 116 includes temperature T7, control signal 208 directs actuator 106 to rotate portions 212 and 214 to positions 228 and 230, respectively, about axis of rotation AR1/AR2. For example: for temperature TC at shutdown of vehicle V, for example of an engine or motor, being within range 225, when prediction 116 includes temperature T8, different from temperature T7, control signal 208 directs actuator 106 to: rotate portion 212 to position 228 or to position 232, different from position 228, about axis AR1/AR2; and rotate portion 214 to position 230 or to position 234, different from position 230, about axis AR1/AR2. For example, as further described below, the choice among positions for portions 212 and 214 is dependent, at least in part, upon the extent of the difference between temperatures T7 and T8.

In an example embodiment, control unit 108 accounts for variations in temperature TC when creating control signal 208. For example, upon shutdown of vehicle V, for example of an engine or motor, and for temperature T in prediction 116 being within range of temperatures 231, for temperature TC3 of coolant C, control signal 208 directs actuator 106 to rotate portions 212 and 214 to positions 236 and 238, respectively, about axis of rotation AR1/AR2. For example, upon shutdown of vehicle V, for example of an engine or motor, and for temperature T in prediction 116 being within range of temperatures 231, for temperature TC4 of coolant C, different from temperature TC3, control signal 208 directs actuator 106 to: rotate portion 212 to position 236 or to position 240, different from position 236, about axis AR1/AR2; and rotate portion 214 to position 238 or to position 242, different from position 238, about axis AR1/AR2. For example, as further described below, the choice among positions for portions 212 and 214 is dependent, at least in part, upon the extent of the difference between temperatures TC3 and TC4.

FIG. 4 is an example table depicting instructions for rotating respective portions of radiator valve 204 and bypass valve 206 for coolant control valve 202 in coolant control system 200 of FIG. 3. FIG. 4 is directed to temperatures typically associated with an internal combustion engine. However, it should be understood that example tables with temperatures T and TC associated with an electric motor or battery are possible. In an example embodiment, control unit 108 uses respective ranges of temperatures T and temperatures TC to generate signal 208. In an example embodiment, control unit 108 parses inputs 119 and 126 into respective temperature ranges for T and TC, and control signal 208 is correlated to, or based upon, the respective temperature ranges.

In FIG. 4, rows are ranges for temperature T, and columns are ranges for temperature TC. Temperatures T are assigned to one of three ranges: less than or equal to five degrees Celsius; greater than five degrees Celsius and up and equal to 25 degrees Celsius; and greater than 25 degrees Celsius. Temperatures TC are assigned to one of four ranges: less than 25 degrees Celsius; from 25 degrees Celsius and up to and including 85 degrees Celsius; from 85 degrees Celsius and up to and including 100 degrees Celsius; and greater than 100 degrees Celsius. Thus, temperatures T5-T8, temperature TC3 and temperature TC4 can be included in respective ranges of temperatures as shown in FIG. 4.

A respective control signal 208 is created by control unit 108 for each cell in FIG. 4. For example: for cell C3, control signal 208 directs actuator 106 to close valve 204 and fully open valve 206; and for cell C4, control signal 208 directs actuator 106 to partially open valve 204 and to partially open valve 206. Note that the same control signal 208 can be applicable to multiple cells of FIG. 4. It should be understood that the number of ranges and the extent of the ranges for temperatures T and TC can vary from those shown in Table 4.

Figure 5:
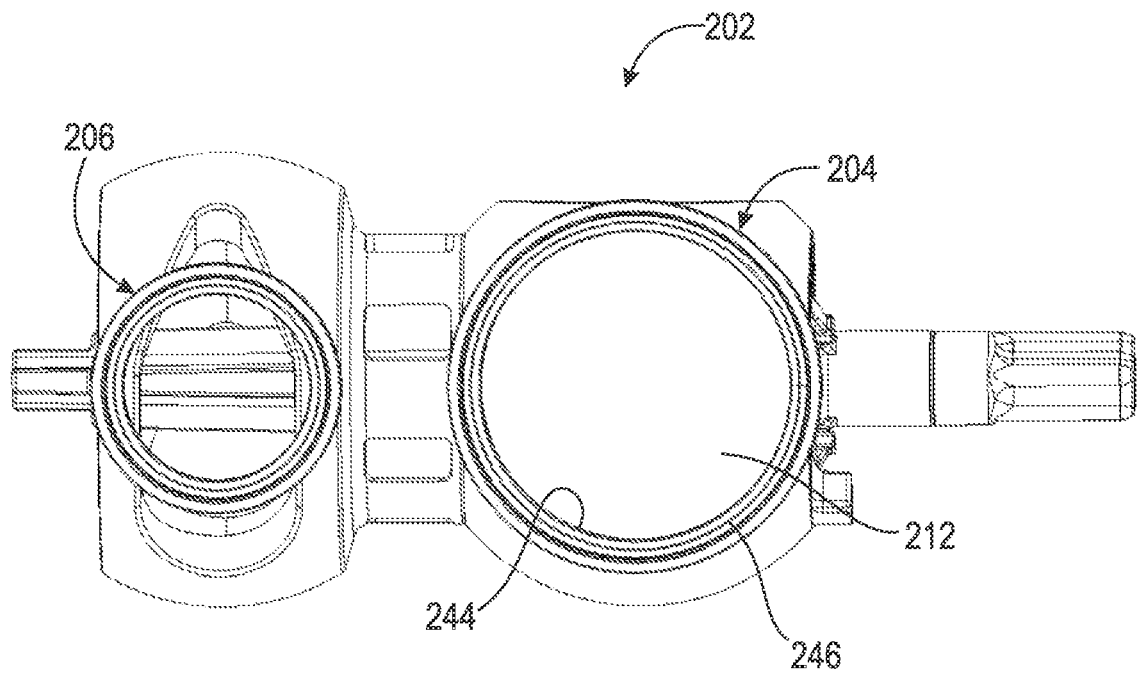
FIG. 5 shows a coolant control valve with a radiator valve closed and a bypass valve fully open.

FIG. 5 shows coolant control valve 202 with radiator valve 204 closed and bypass valve 206 fully open.

Figure 6:
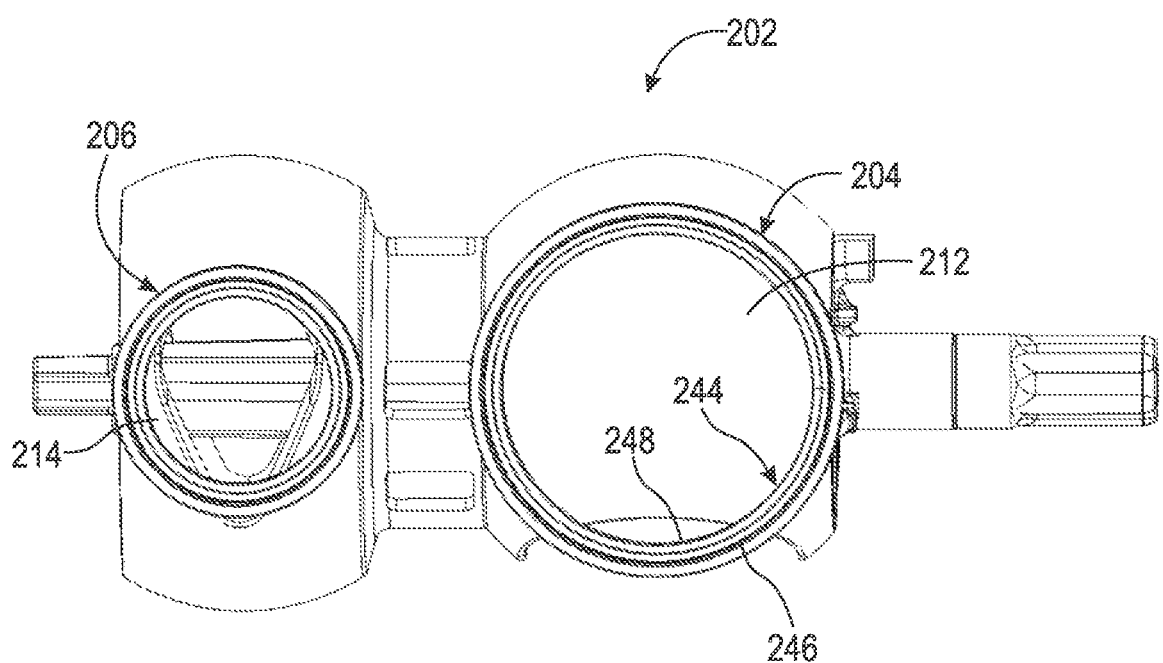
FIG. 6 shows the coolant control valve of FIG. 5 with the radiator valve partially open and the bypass valve partially open; and, FIG. 7 shows a prior art coolant control valve in a known park position.
Figure 7:
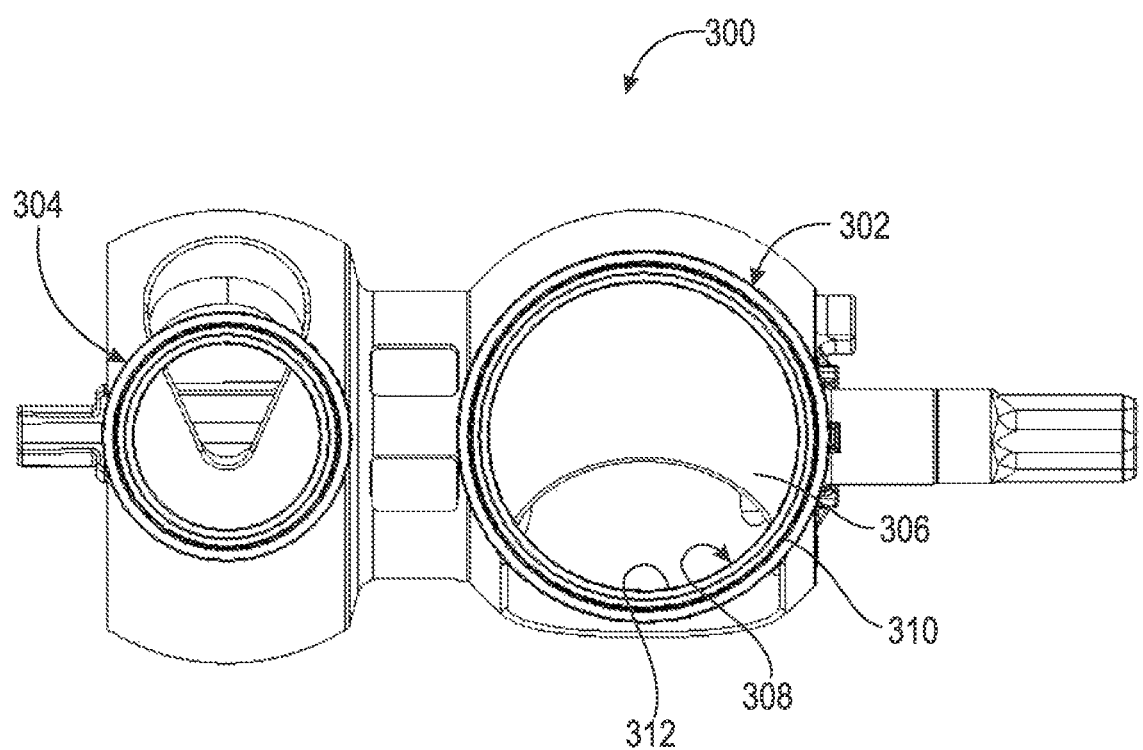

FIG. 6 shows coolant control valve 202 of FIG. 5 with radiator valve 204 partially open and bypass valve 206 partially open. The following should be viewed in light of FIGS. 3 through 5. FIG. 5 shows the positions for valve 204 and valve 206 for cell C1 in FIG. 4. FIG. 5 shows the positions for valve 204 and valve 206 for cell C2 in FIG. 4. In the example of FIGS. 5 and 6, valve 204 is a ball valve and portion 212 is a ball for the ball valve. Valve 204 includes seal 244. It should be understood that the positions shown in FIGS. 5 and 6 for valve 204 are applicable to valve 104 in FIGS. 1 and 2.

The following should be viewed in light of FIGS. 1 and 2. The following describes a method of controlling a coolant control valve for a coolant system for vehicle. Although the method is presented as a sequence of steps for clarity, no order should be inferred from the sequence unless explicitly stated. A first step operates vehicle V, for example operates an internal combustion engine or an electric motor. A second step shuts down vehicle V, for example shuts down the engine or motor. A third step creates, with control unit 108 and based upon prediction 116, control signal 112. A fourth step transmits, using control unit 108, control signal 112. A fifth step receives, with actuator 106, control signal 112. A sixth step rotates, with actuator 106 and according to control signal 112, portion 118 about axis of rotation AR1. A seventh step: receives, using control unit 108, temperature input 119, and generates, using control unit 108, prediction 116 using input 119; or receives an input including prediction 116.

When prediction 116 is for ambient temperature T1 upon shutdown of vehicle V, an eighth step rotates, with actuator 106 and according to control signal 112, portion 118 to position 122. When prediction 116 is for ambient temperature T2, a ninth step rotates, with actuator 106 and according to control signal 112, portion 118 to position 122 or to position 124.

For temperature TC being in range 125 upon shutdown of vehicle V, when prediction 116 is for ambient temperature T3, a tenth step rotates, with actuator 106 and according to control signal 112, portion 118 to position 128. For temperature TC being in range 125 upon shutdown of vehicle V, when prediction 116 is for ambient temperature T4, an eleventh step rotates, with actuator 106 and according to control signal 112, portion 118 to position 128 or to position 130.

Upon shutdown of vehicle V and for a temperature T in prediction 116 being in range 131, for temperature TC1 of coolant C: a twelfth step rotates, with actuator 106 and according to control signal 112, portion 118 to position 132. Upon shutdown of vehicle V, for example of an engine or motor, and for temperature T in prediction 116 being in range 131, for temperature TC2 of coolant C, a thirteenth step rotates, with actuator 106 and according to control signal 112, portion 118 to position 132 or to position 134.

In an example embodiment, rotating, with actuator 106 and according to control signal 112, portion 118 includes: partially opening radiator valve 104; or fully closing radiator valve 104.

The following should be viewed in light of FIGS. 1 through 6. The following describes a method of controlling a coolant control valve for a coolant system for a vehicle. Although the method is presented as a sequence of steps for clarity, no order should be inferred from the sequence unless explicitly stated. A first step operates vehicle V, for example, operates an internal combustion engine or an electric motor. A second step shuts down vehicle V, for example shuts down the engine or motor. A third step creates, with control unit 108 and based upon prediction 116, control signal 208. A fourth step transmits, using control unit 108, control signal 208. A fifth step receives, with actuator 106, control signal 208. A sixth step rotates, with actuator 106 and according to control signal 208, portion 212 about axis of rotation AR1. A seventh step rotates, with actuator 106 and according to control signal 208, portion 214 about axis of rotation AR2. An eighth step receives, using control unit 108, temperature input 119, and generates, using control unit 108, prediction 116 using input 119; or receives an input including prediction 116.

When prediction 116 is for temperature T5 upon shutdown of vehicle V, a ninth step: rotates, with actuator 106 and according to control signal 208, portion 212 to position 218; and rotates, with actuator 106 and according to control signal 208, portion 214 to position 220. When prediction 116 is for temperature T6, different from temperature T5 upon shutdown of vehicle V, a tenth step: rotates, with actuator 106 and according to control signal 208, portion 212 to position 218 or position 222, different from position 218; and rotates, with actuator 106 and according to control signal 208, portion 214 to position 220 or position 224, different from position 220.

For temperature TC being in range 225 upon shutdown of vehicle V, when prediction 116 includes temperature T7: an eleventh step: rotates, with actuator 106 and according to control signal 208, portion 212 to position 228; and rotates, with actuator 106 and according to control signal 208, portion 214 to position 230. For temperature TC being in range 225 upon shutdown of vehicle V, when prediction 116 includes temperature T8, a twelfth step: rotates, with actuator 106 and according to control signal 208, portion 212 to position 228 or position 232, different from position 228; and rotates, with actuator 106 and according to control signal 208, 214 to position 230 or to position 234, different from position 230.

For temperature T being in range 231 and for temperature TC3 upon shutdown of vehicle V, a thirteenth step: rotates, with actuator 106 and according to control signal 208, portion 212 to position 236; and rotates, with actuator 106 and according to control signal 208, portion 214 to position 238. For temperature T being in range 231 and for temperature TC4 upon shutdown of vehicle V, a fourteenth step: rotates, with actuator 106 and according to control signal 208, portion 212 to position 236 or position 240, different from position 236; and rotates, with actuator 106 and according to control signal 208, portion 214 to position 238 or position 242, different from position 238.

In an example embodiment: radiator valve 204 is a ball valve and portion 212 is a first ball, non-rotatably connected to shaft 216 for valve 202; and bypass valve 206 is a separate ball valve and portion 214 is a ball non-rotatably connected to shaft 216 for valve 202. Rotating, with actuator 106 and according to prediction 116, portions 212 and 214 includes rotating shaft 216.

In an example embodiment, rotating, with actuator 106 and according to control signal 208, portion 212 includes: partially opening radiator valve 204; or fully closing radiator valve 204. In an example embodiment, rotating, with actuator 106 and according to control signal 208, portion 214 includes: fully opening bypass valve 206; or partially opening bypass valve 206; or fully closing bypass valve 206.

Example ball valve 204 includes seal 244 and spring 246 urging seal 244 inwardly into contact with ball 212. Fluid flow is blocked at areas of contact between seal 244 and ball 212.

As noted above, the known park position for coolant control valve 300 can result in seal deformation due to the extent of unsupported segment 312 of seal 308. Valves 102 and 202 and the methods described above resolve the seal deformation issue. For example, in the position shown for portion (ball) 212 in FIG. 5, the entirety of seal 244 is in contact with, supported by, and prevented from deforming by ball 212. For example, in FIG. 6, segment 248 of seal 244, which is not supported by ball 212, is significantly less than segment 312 for prior art radiator valve 300, greatly reducing or eliminating the likelihood of deformation of seal 244.

Further, by basing a park position on a predicted ambient temperature and a temperature of coolant upon shutdown of vehicle V, optimal conditions are established for the next vehicle V start up. For example, looking to Table 4 and assuming system 100 is for an internal combustion engine, in cell C5, the predicted temperature is relatively low as is the coolant temperature. Therefore, the optimal strategy is to conserve coolant temperature by closing both the radiator and bypass valves. For example, looking to Table 4, the conditions in cell C6 are furthest from cell C3, that is, the predicted temperature and the coolant temperature are both relatively high. Therefore, the optimal strategy is to reduce coolant temperature as much as possible, while protecting against deformation of seal 244, by partially opening radiator valve 202 and partially opening bypass valve 206.

In the example of FIGS. 2 and 4, there are two possible positions for valve 102 and valve 202, respectively: valve fully closed; or valve partially open. In the partially open position, valves 102 and 202 are more closed than is the case for valve 300. For example, for a typical park position of valve 300, ball 306 is rotated to a rotary valve delivery angle position of 261 degrees. In contrast, in the example of FIG. 6, ball 306 is rotated to a rotary valve delivery angle position of 285 degrees. Thus, for the same size balls 212, and 306, the extent of segment 248 of seal 244 is less than the extent of segment 312 of seal 306. It should be understood that more than two park positions are possible for valves 102 and 202.

In an example embodiment: one of the possible rotary valve delivery angle positions for valve 202 is substantially equal to 261; however at least one respective possible rotary valve delivery angle park position for valve 202 results in unsupported segment 248 of seal 244 being smaller (for a same diameter ball 306 and ball 212) than unsupported segment 312 of seal 308. For example, one of the rotary valve delivery angle park positions for valve 202 is 285 degrees. The preceding discussion is applicable to valve 102 as well.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

B battery
C coolant
EM electric motor
GPSS GPS satellite
HD heat-producing device
ICE internal combustion engine
R radiator
T ambient temperature
T1-T8 ambient temperature
TC coolant temperature
TC1 coolant temperature
TC2 coolant temperature
TC3 coolant temperature
TC4 coolant temperature
TS1 temperature sensor
TS2 temperature sensor
WP water pump
V vehicle
100 coolant control system
102 coolant control valve
104 radiator valve
106 actuator
108 control unit
110 electric motor
112 control signal
116 prediction
118 portion of valve 104
119 temperature input
120 shaft
122 position of portion 118
124 position of portion 118
126 input
128 position of portion 118
130 position of portion 118
132 position of portion 118
134 position of portion 118
200 coolant control system
202 coolant control valve
204 radiator valve
206 bypass valve
208 control signal
212 portion of valve 204
214 portion of valve 206
216 shaft
218 position of valve 204
220 position of valve 206
222 position of valve 204
224 position of valve 206
228 position of valve 204
230 position of valve 206
232 position of valve 204
234 position of valve 206
236 position of valve 204
238 position of valve 206
240 position of valve 204
242 position of valve 206
244 seal
246 spring
248 segment of seal 244
300 prior art CCV
302 radiator valve
304 bypass valve
306 ball
308 seal
310 spring
312 segment of seal 308

The invention claimed is:

1. A coolant control system for a vehicle, comprising:
   a coolant control valve including a radiator valve, the radiator valve including a portion;
   an actuator connected to the coolant control valve; and,
   a control unit, wherein upon shutdown of the vehicle:
     the control unit is arranged to:
       wirelessly receive a prediction of a future ambient temperature;
       generate a control signal based upon the prediction of the future ambient temperature; and,
       transmit the control signal to the actuator; and,
     the actuator is arranged to:
       receive the control signal; and,
       rotate the portion of the radiator valve according to the control signal, wherein:
   the portion of the radiator valve is arranged to control flow of coolant through the radiator valve to a radiator;
   when the prediction of the future ambient temperature includes a first temperature, the actuator is arranged to rotate the portion of the radiator valve to a first partially open position about an axis of rotation for the portion of the radiator valve; and, when the prediction of the future ambient temperature includes a second temperature, different from the first temperature, the actuator is arranged to rotate the portion of the radiator valve to a second partially open position about the axis of rotation for the portion of the radiator valve, the second partially open position different from the first partially open position.

2. The coolant control system of claim 1, wherein:
the coolant control valve includes a bypass valve; and,
the actuator is arranged to rotate a portion of the bypass valve according to the control signal.

3. The coolant control system of claim 2, wherein:
the radiator valve is a first ball valve;
the portion of the radiator valve includes a first ball;
the bypass valve is a second ball valve;
the portion of the bypass valve includes a second ball;
the first ball and the second ball are non-rotatably connected to a shaft; and,
the actuator is arranged to rotate the shaft according to the control signal.

4. The coolant control system of claim 1, wherein upon shutdown of the vehicle and for the prediction of the future ambient temperature being in a range of temperatures:
for a first temperature of a coolant for the vehicle, the actuator is arranged to rotate the portion of the radiator valve to a first position about the axis of rotation for the portion of the radiator valve; and,
for a second temperature of the coolant, different from the first temperature, the actuator is arranged to rotate the portion of the radiator valve to a second position about the axis of rotation for the portion of the radiator valve.

5. The coolant control system of claim 1, wherein for a temperature for a coolant for the coolant control system being in a range of temperatures upon shutting down the vehicle:
when the prediction of the future ambient temperature is for a first ambient temperature, the actuator is arranged to rotate the portion of the radiator valve to the first partially open position about the axis of rotation for the radiator valve; and,
when the prediction of the future ambient temperature is for a second ambient temperature, different from the first ambient temperature, the actuator is arranged to rotate the portion of the radiator valve to:
the first partially open position; or,
a closed position about the axis of rotation for the portion of the radiator valve.

6. The coolant control system of claim 1, wherein:
upon shutdown of the vehicle and for a first prediction of the future ambient temperature and a first temperature of a coolant for a heat producing device including an internal combustion engine or an electric motor, the actuator is arranged to rotate the portion of the radiator valve to the first partially open position about the axis of rotation for the portion of the radiator valve; and,
upon shutdown of the vehicle and for a second prediction of the future ambient temperature, different from the first prediction of the future ambient temperature, and for a second temperature of the coolant, different from the first temperature of the coolant, the actuator is arranged to rotate the portion of the radiator valve to:
the first partially open position; or,
a closed position about the axis of rotation for the portion of the radiator valve.

7. The coolant control system of claim 1, wherein the control unit is arranged to wirelessly receive the prediction of the future ambient temperature from a satellite.

8. The coolant control system of claim 1, wherein the control unit is arranged to wirelessly receive the prediction of the future ambient temperature from a global position system satellite.

9. The coolant control system of claim 4, wherein the first position about the axis of rotation for the portion of the radiator valve is the first partially open position about the axis of rotation for the portion of the radiator valve.

10. A coolant control system for a vehicle, comprising:
a coolant control valve including a radiator valve arranged to connect to a radiator for a heat-producing device for the vehicle, the radiator valve including a ball;
an actuator connected to the coolant control valve; and,
a control unit, wherein upon shutdown of the vehicle:
the control unit is arranged to:
generate a control signal based upon a prediction of a future ambient temperature; and,
transmit the control signal to the actuator; and,
the actuator is arranged to:
receive the control signal; and,
rotate, according to the control signal, the ball of the radiator valve to an at least partially open position to enable coolant flow through the radiator valve to a radiator.

11. A coolant control system for a vehicle, comprising:
a coolant control valve including a radiator valve arranged to connect to a radiator for a heat-producing device for the vehicle, the radiator valve including a portion;
an actuator connected to the coolant control valve; and,
a control unit, wherein upon shutdown of the vehicle:
the control unit is arranged to:
wirelessly receive a prediction of a future ambient temperature;
generate a control signal based upon the prediction of the future ambient temperature; and,
transmit the control signal to the actuator; and,
the actuator is arranged to:
receive the control signal; and,
rotate, according to the control signal, the portion of the radiator valve to an at least partially open position to enable coolant flow through the radiator valve to a radiator.

* * * * *